United States Patent [19]
Dorbeck

[11] 4,309,984
[45] Jan. 12, 1982

[54] SOLAR ENERGY COLLECTION SYSTEM

[75] Inventor: Leo R. Dorbeck, Campbellville, Canada

[73] Assignee: Canadian Sun Systems Ltd., Campbellville, Canada

[21] Appl. No.: 101,808

[22] Filed: Dec. 10, 1979

[51] Int. Cl.³ ............................................. F24J 3/02
[52] U.S. Cl. ..................................... 126/422; 126/438
[58] Field of Search ............... 126/438, 422, 448, 442, 126/450, 424, 425; 350/293, 298

[56] References Cited

U.S. PATENT DOCUMENTS

| 3,915,147 | 10/1975 | Rineer | 126/438 X |
| 3,951,128 | 4/1976 | Schoenfelder | 126/438 |
| 4,038,971 | 8/1977 | Bezborodko | 126/438 |
| 4,099,515 | 7/1978 | Schertz | 126/438 |
| 4,130,107 | 12/1978 | Rabl et al. | 126/438 |
| 4,138,994 | 2/1979 | Shipley, Jr. | 126/438 |
| 4,142,514 | 3/1979 | Newton | 126/438 |
| 4,143,643 | 3/1979 | Gerin et al. | 126/438 |
| 4,158,356 | 6/1979 | Wininger | 126/438 |
| 4,198,955 | 4/1980 | Dorbeck | 126/443 X |
| 4,256,091 | 3/1981 | Hallows | 126/438 |

Primary Examiner—Samuel Scott
Assistant Examiner—Randall L. Green
Attorney, Agent, or Firm—Sim & McBurney

[57] ABSTRACT

A solar collector of the CPC-type is described. The collector is provided in modular form with a plurality of elongate forming reflectors housed within an outer metal tray and a glass cover. An absorber tube passes sequentially through the reflectors and is normally located at the focus of the reflectors to permit fluid passing therethrough to be located. To provide on-going heat regulation and shut-down capability, the absorber tubes are movable out of the reflector focus by an automatic device which senses excessive temperatures and effects the defocussing movement in response thereto.

25 Claims, 13 Drawing Figures

SOLAR ENERGY COLLECTION SYSTEM

FIELD OF INVENTION

The present invention relates to a solar energy collection system utilizing compound parabolic concentrators.

BACKGROUND TO THE INVENTION

Solar energy collection systems using compound parabolic concentrators (CPC's) are known and are described in my U.S. patent application Ser. No. 902,381 filed May 3, 1978 (now U.S. Pat. No. 4,198,955), and its equivalent Canadian Pat. No. 1,047,343, the disclosure of which is incorporated herein by reference.

A CPC collector is characterized by a compound parabolic shape which concentrates solar energy received through the mouth of the parabola onto a tube through which fluid to be heated is passed. The parabolic shape is determined by the relationship of the concentration ratio (C), i.e., the ratio of the transverse width of the mouth to the outer circumference of the tube, to the acceptance angle ($\theta$), which is the angle to the axis of the parabola within which light rays are concentrated onto the tube. The relationship is $$C = (1/\sin \theta)$$

In my aforementioned Canadian Patent, there is described a solar energy collection system which is comprised of modular solar collectors. Each module comprises a plurality of elongate envelopes physically joined together in fixed immovable relationship to each other in an integral body structure and a transparent cover sealingly joined to the body structure. Each envelope is evacuated and has a reflective inner surface. A tube having a selectively absorbing surface for selectively absorbing energy having predetermined wavelengths passes sequentially through the envelopes. The tube conveys fluid to be heated to the module and removes heated fluid from the module.

Although the modular construction is satisfactory, difficulties have arisen in constructing an integral body structure of the type described in the aforementioned patent, especially of vitreous ceramic material. One aspect of the invention is concerned with an improved form of body construction for the module.

A CPC-type collector is highly efficient in collecting solar energy and in heating fluid passing through the tube. Problems arise, however, when the thermal demand on the system is satisfied, both in the short and in the long term, or when stagnation occurs as a result of loss of transport fluid, pump failure, power failure, limited thermal storage capacity and human error, at which time it becomes necessary to "switch-off" the collector. If such shut-down did not occur, irrevocable damage to the selective coating of the absorber tube could occur and an undesirable pressure rise in the fluid system may result. A second aspect of the invention provides a mechanism for obviating these problems.

SUMMARY OF INVENTION

The present invention, in one aspect, is concerned with a modular solar energy collector having a plurality of individual collectors arranged in a module having a transparent cover. The lower body element comprises an outer tray-like body, usually constructed of metal, a plurality of parallel elongate upright walls which divide the tray into a plurality of parallel separate compartments, and a plurality of CPC-shaped reflectors mounted in the compartments.

In a second aspect, the invention is concerned with an improved form of CPC-collector having means for moving the absorber tube assembly out of the focal plane of the concentrator in response to sensed conditions of the collector.

DESCRIPTION OF PREFERRED EMBODIMENTS

Figure 1:
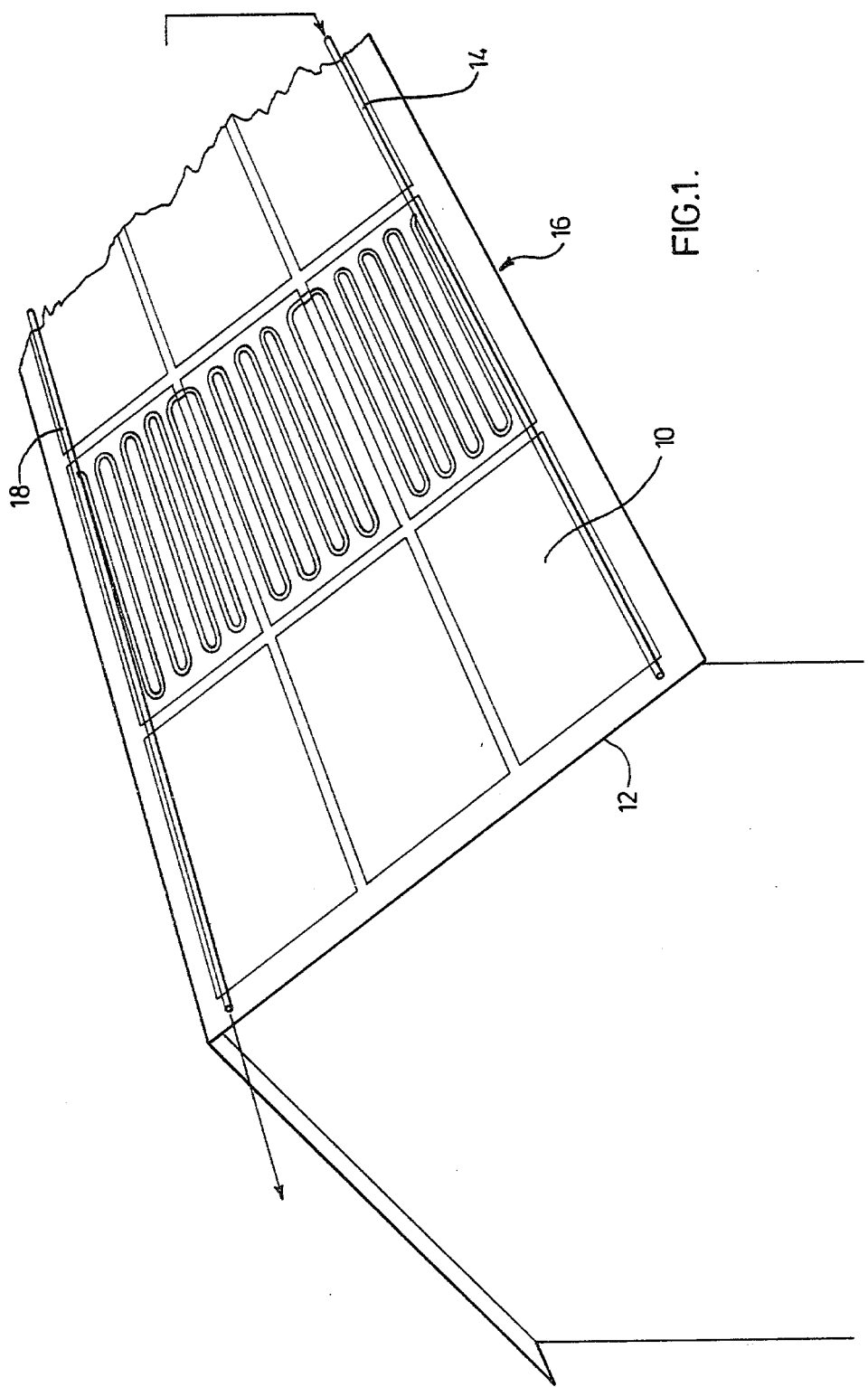
FIG. 1 is a schematic perspective view of a building roof bearing a plurality of modular solar energy collectors constructed in accordance with one embodiment of this invention.

Referring first to FIG. 1, a solar energy collection module 10 may be mounted with a plurality of similar modules 10 on a building roof 12, or similar structure. A single fluid inlet pipe 14 extends the length of the roof structure 12 to pump transport fluid to be heated in parallel to a plurality of banks of modules 16, each bank comprising any convenient number of modules 10 connected in any convenient manner for serial flow of transport fluid through the bank 16. A single fluid outlet pipe 18 extends the length of the roof structure 12 to receive heated transport fluid in parallel from the backs of modules 16. As is illustrated, the inlet and outlet pipes 14 and 18 are housed within the modules 10 for the purposes of thermal efficiency.

Figure 2:
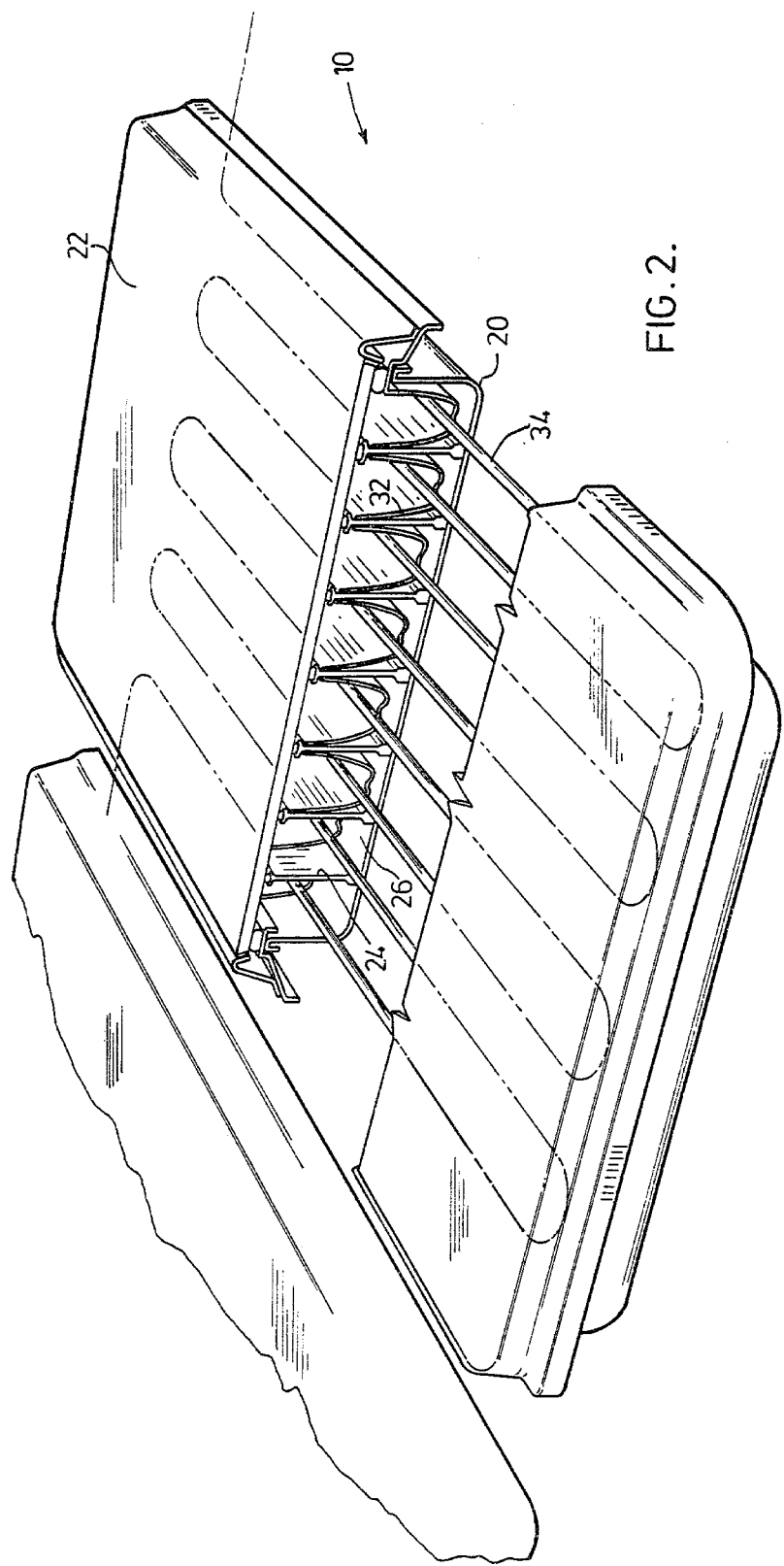
FIG. 2 is a perspective view, with parts away for clarity, of a modular solar energy collector constructed in accordance with one aspect of this invention.
Figure 3:
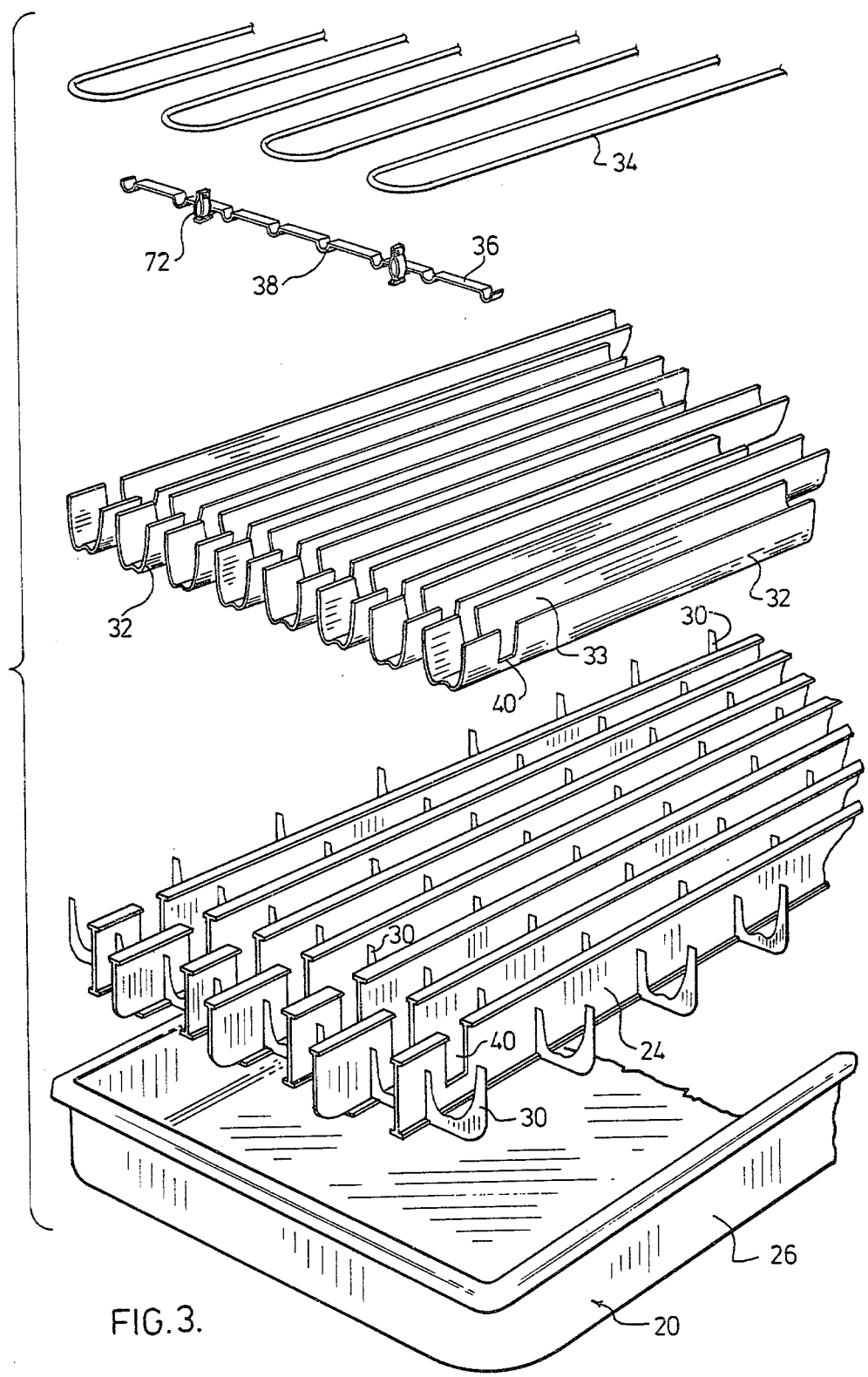
FIG. 3 is an exploded perspective view of the modular solar collector of FIG. 2 with the cover removed.
Figure 4:
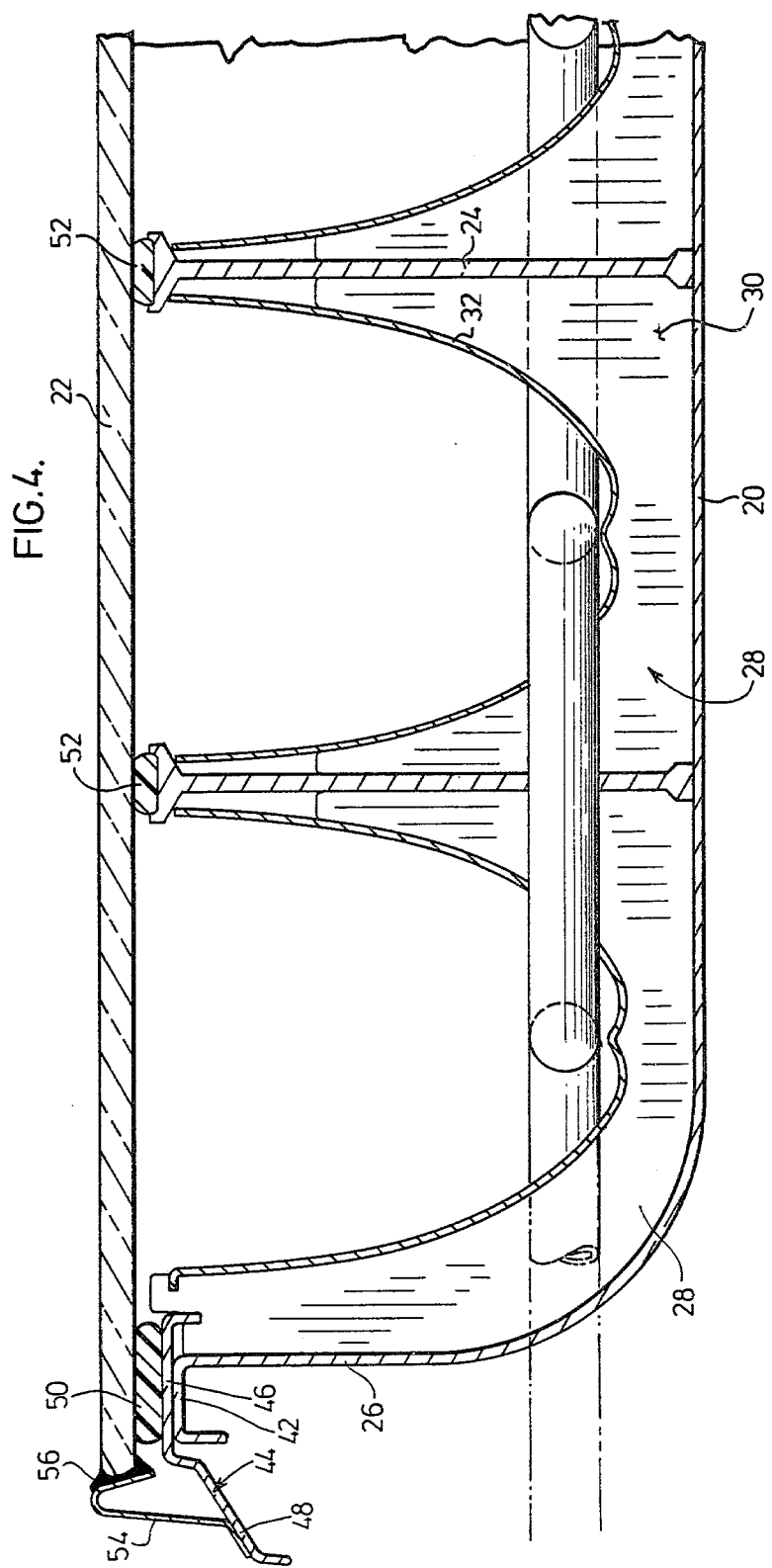
FIG. 4 is an end view of a portion of the modular solar collector of FIG. 2 illustrating detail of the assembly of the base and the cover and the manner of sealing of the cover to the base.

The detailed structure of each module 10 is illustrated in FIGS. 2 to 4. The module 10 includes a lower tray-like member 20 constructed of any convenient material, typically steel, and an upper transparent cover member 22 constructed of any convenient material, typically glass.

A plurality of wall members 24 of generally I-cross-section are positioned in the tray 20 and extend longitudinally in parallel spaced-apart relationship and vertically between the base of the tray 20 and the cover member 22. The wall members 24 define with each other and with the side walls 26 of the tray 20 a plurality of individual compartments 28.

Extending transversely within each compartment 28 and connected to the wall members 24, such as by brazing, is a plurality of support elements 30 of thin transverse dimension and shaped to receive a reflector 32 having a reflecting surface 33. The plurality of support elements 30 in each compartment 28 serve to support the reflector 32 therein. Each reflector 32 has a compound parabolic shape, as discussed in more detail below, and is connected to the support elements 30, such as by brazing, to provide an integrated structure.

Although the modular collector 10 is illustrated as having eight reflectors 32 supported in the eight corresponding compartments 26, this number is chosen for convenience of overall size of module 10 and any other desired number may be employed.

An absorber tube 34 passes sequentially through each compartment 26 normally at the focus of the reflector 32 for conveying transport fluid to be heated through the modular collector 10. The inlet and outlet of the absorber tube 34 to the modular collector 10 are thermally insulated from the tray 20 in any convenient manner. The absorber tube 34 has an outer coating layer of a material, such as, chrome-black, which selectively absorbs energy of a certain wavelength, generally about $3 \times 10^{-7}$ to about $3 \times 10^{-6}$ meters, while not absorbing other wavelengths. The use of a selectively absorbent material coating in this way minimizes heat looses from the tube 34 through radiation.

The absorber tube 34 may be supported at the focus of the reflector 32 for the absorbtion of heat in any convenient manner. As will become apparent below from the detailed discussion of FIGS. 7 to 13, it is preferred to provide such support by two transverse mounting bars 36 having tube-receiving depressions 38 therein in which the absorber tube 34 is brazed, or otherwise connected to provide efficient heat conduction from the tube 34 to the mounting bars 36. The mounting bars 36 are located one adjacent each end of the module 10 in transversely-aligned slots 40 cut out from the walls 24 and the reflectors 32.

The module 10 is evacuated to improve the solar energy absorbing efficiency, requiring sealing of the cover 22 to the tray 20. As may be seen from the detail of FIG. 4, the periphery of the tray 20 is provided with a horizontal outwardly-extending rim 42 to which is brazed or otherwise attached a metal flange 44.

The flange 44 includes a horizontal portion 46 which is connected to the rim 42 and a downwardly-sloped portion 48. Positioned between the horizontal portion 46 and the glass cover 22 is a gasket 50. Gaskets 52 are provided between the upper end of each of the metal walls 24 and the glass cover 22. The gaskets 50 and 52 provide dynamic support between the metal and glass surfaces.

A thin rolled metal flange 54 of limited resilient flexibility is welded to the portion 48 of the flange 44 and is hermetically-fused to the glass sheet 22 at 56 at any convenient glass to metal sealing procedure. This glass to metal seal arrangement is efficient in maintaining the internal vacuum and the flexible flange 54 allows the glass to bend along two parallel edges of the cover 22 so as to minimize stresses in the edge seal area. When the cover glass 22 is deflected due to atmospheric loading, the outer surface of the glass 22 is in compression while the underside of the glass is in tension.

The construction of the base portion of the collector 10 described above is superior in many respects to that described in the aforementioned Canadian Pat. No. 1,047,343. The metal tray 20, assembly of walls 24 and transverse supports 30, and reflectors 32 are each readily individually constructed and assembled together into a unitary structure. The unitary structure is physically strong and any damaged reflector is easily replaced, without any necessity to replace the whole unit.

Figure 6:
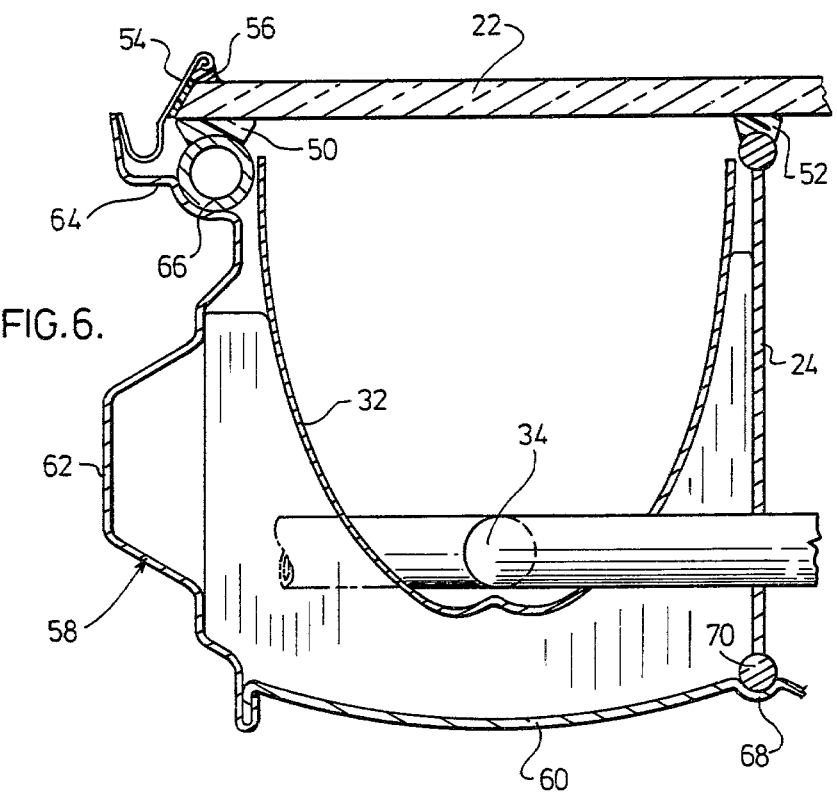
FIG. 6 is an end view similar to FIG. 4 illustrating an alternative mode of sealing of the cover to the base.

An alternative tray construction and seal construction is shown in FIG. 6. To impart additional structural strength to the side walls 26 of the tray 20, the tray is formed of interconnected wall and floor parts 58 and 60 and the wall parts 58 are roll formed and shaped to provide an outwardly-extending portion 62. The wall part 58 also includes an integral flange portion 64 to which the flexible flange 54 is welded.

The integral flange portion 64 includes a part-circular recess in which is welded an elongate tubular member 66 on which the gasket 50 is placed. The mating curved surfaces of the gasket 50 and the pipe 66 permit the gasket 50 to roll on the pipe surface so as to accept bending moments at the outside perimeter of the gasket 50 resulting from expansion and contraction of the glass sheet 22. Another similar structure utilizes a convexly curved lower surface of the gasket 50 rolling on a relatively flat portion of a flange.

To ensure proper location of the wall 24, the floor part 60 is provided with part-circular depressions 68 therein which receive a bead 70 attached to the lower end of the wall 24.

Figure 5:
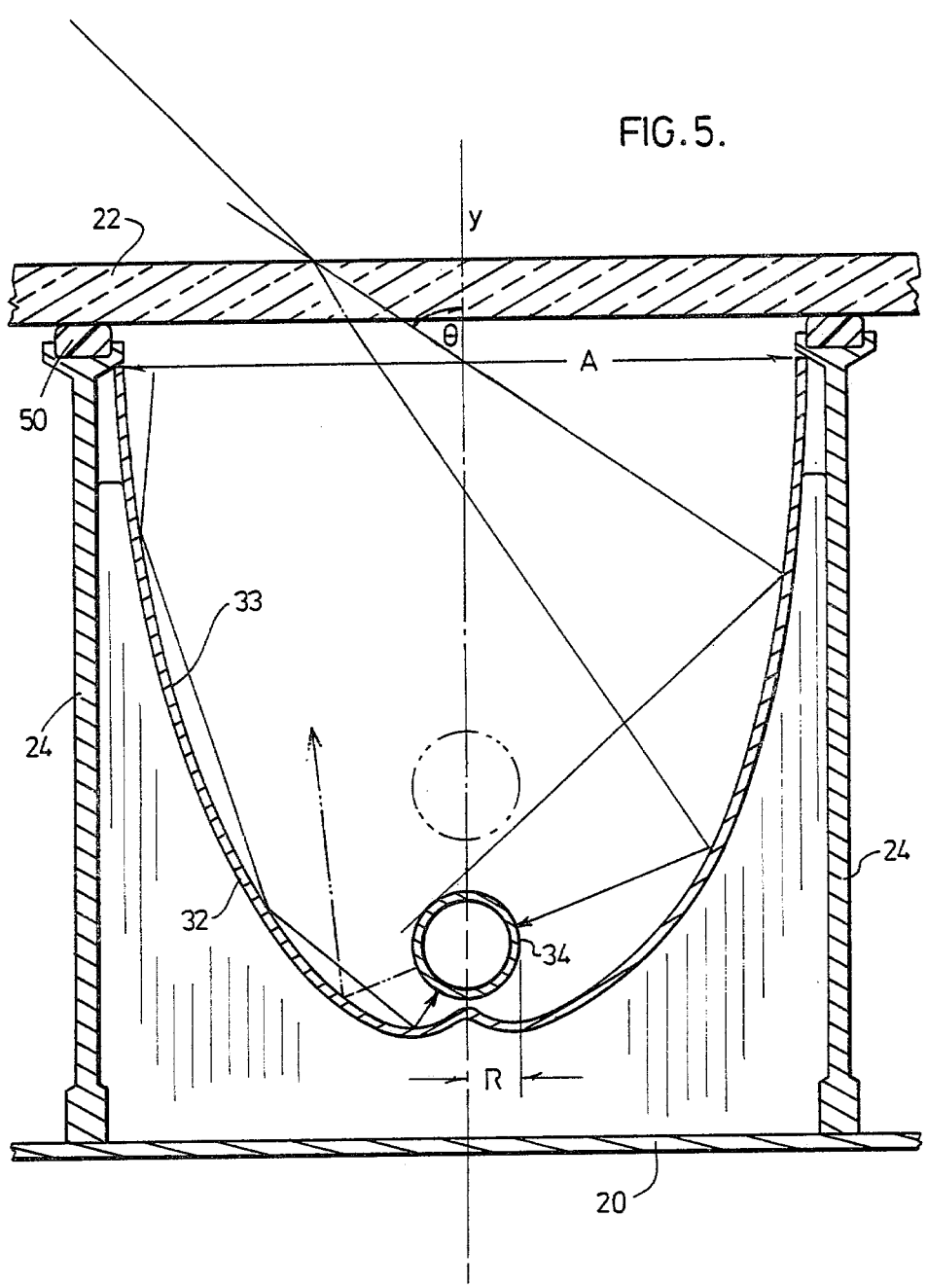
FIG. 5 is an end view of the reflector in one of the collectors of the modular unit of FIG. 2 showing the absorber tube in focussed (full line) and non-focussed (dotted line) positions.

As mentioned previously, the reflectors 32 are of compound parabolic shape to concentrate solar energy received through the glass cover 22 onto the absorber tube 34. Referring specifically to FIG. 5, the concentration ratio (C) of the reflector 32 is determined by the ratio:

$$C = \frac{\text{Entrance Aperture Width}}{\text{Absorber Tube Circumference}} = \frac{A}{2\pi R}$$

The acceptance angle ($\theta$) is the angle to the axis (y) within which all rays entering the individual reflector 32 through the cover 22 are absorbed by the absorber tube 34 while rays outside that angle are reflected without being absorbed. The limiting condition for the acceptance of rays for absorption is a ray which is reflected by the reflecting surface 33 to pass tangentially to the absorber tube 34, as illustrated.

In a collector of maximum efficiency of reflection of incident rays, the acceptance angle ($\theta$) is determined by the concentration ratio (C), in accordance with the equation:

$$C = 1/\sin \theta$$

and the locus of the reflecting surface 33 is the shape corresponding to that equation.

It follows from the above equation, as the concentration ratio (C) increases, the acceptance angle ($\theta$) decreases. The value of the acceptance angle determines the length of time during a given day when the collector will absorb light rays, assuming that the module is in a fixed relationship with respect to sun movement, which usually is the case. The value of the concentration ratio will determine the temperature rise attainable in the absorber tube 34 during the time that the rays are accepted within the acceptance angle, with an increase in concentration ratio leading to an increase in temperature under otherwise fixed conditions.

The minimum concentration ratio is about 1 and the upper limit of concentration ratio for a fixed location system is about 10. If the collector module 10 is mounted to track the sun's movement on a daily basis or if the sun's rays can be concentrated within the narrow acceptance angle which exists at these high concentration ratios, then the concentration ratio may exceed 10, although it will rarely exceed 50.

Preferably, the concentration ratio is about 1.0 to about 3.0, most preferably about 1.5 to about 2.0, which provides a good balance of acceptance angle and concentration ratio, so that the reflector 32 has a sufficiently wide acceptance angle to absorb rays over a long period of daylight hours, while at the same time providing a good heating effect on the fluid flowing through the absorber tube 34.

If the physical height of the reflector 32 is decreased without otherwise altering its shape, the concentration ratio is decreased and this leads to a less than maximum efficiency of the reflector 32. Since, however, the upper portions of the reflector 32 adjacent the cover are almost parallel and have only a minor effect on the rays which are absorbed by the tube 34, the loss of efficiency need only be minor. The material saving achieved as a result of the diminished overall physical height of the tray 20 required to accommodate the truncated reflector 32, may be considerable.

Generally, when the truncated form of the reflector 32 is adopted, the concentration ratio (C) is always maintained greater than about 1. The maximum loss of efficiency from ideal conditions is about 25%, while preferably the loss of efficiency tolerated on truncation is less than about 10%.

Turning now to FIGS. 3 and 7 to 10, there is illustrated therein one embodiment of a mechanism for moving the absorber tube 34 out of the focal point of the reflector 32 so that then only a minor proportion of the solar energy received through the cover 22 impinges on the absorber 34. In the illustrated embodiment, and in the additional illustrated embodiment of FIGS. 11 to 13, it is the absorber tube 34 which is moved relative to the reflector 32. It is within the scope of the invention, however, to move the reflector 32 relative to the tube 34 to achieve the focussing and defocussing.

Figure 7:
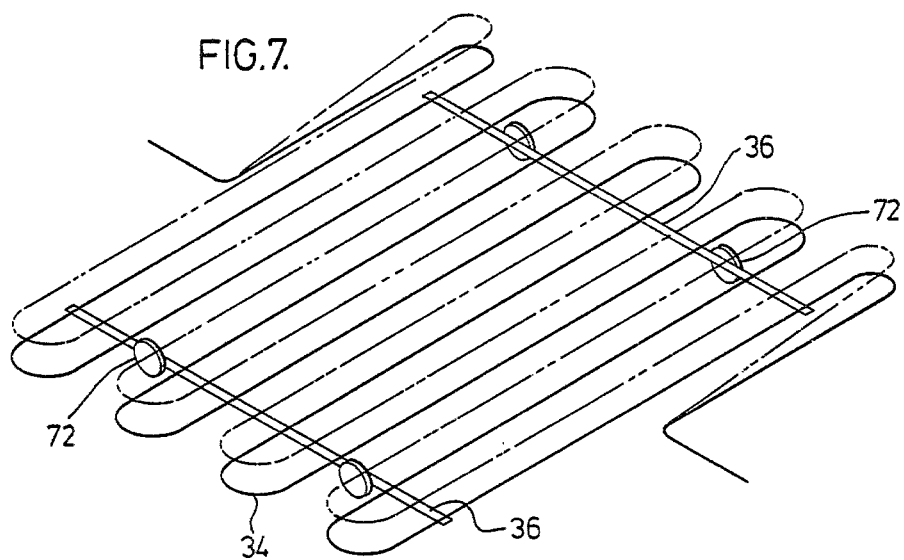
FIG. 7 is a schematic perspective view showing the absorber tubes in focussed (full line) and non-focussed (dotted line) positions.
Figure 8:
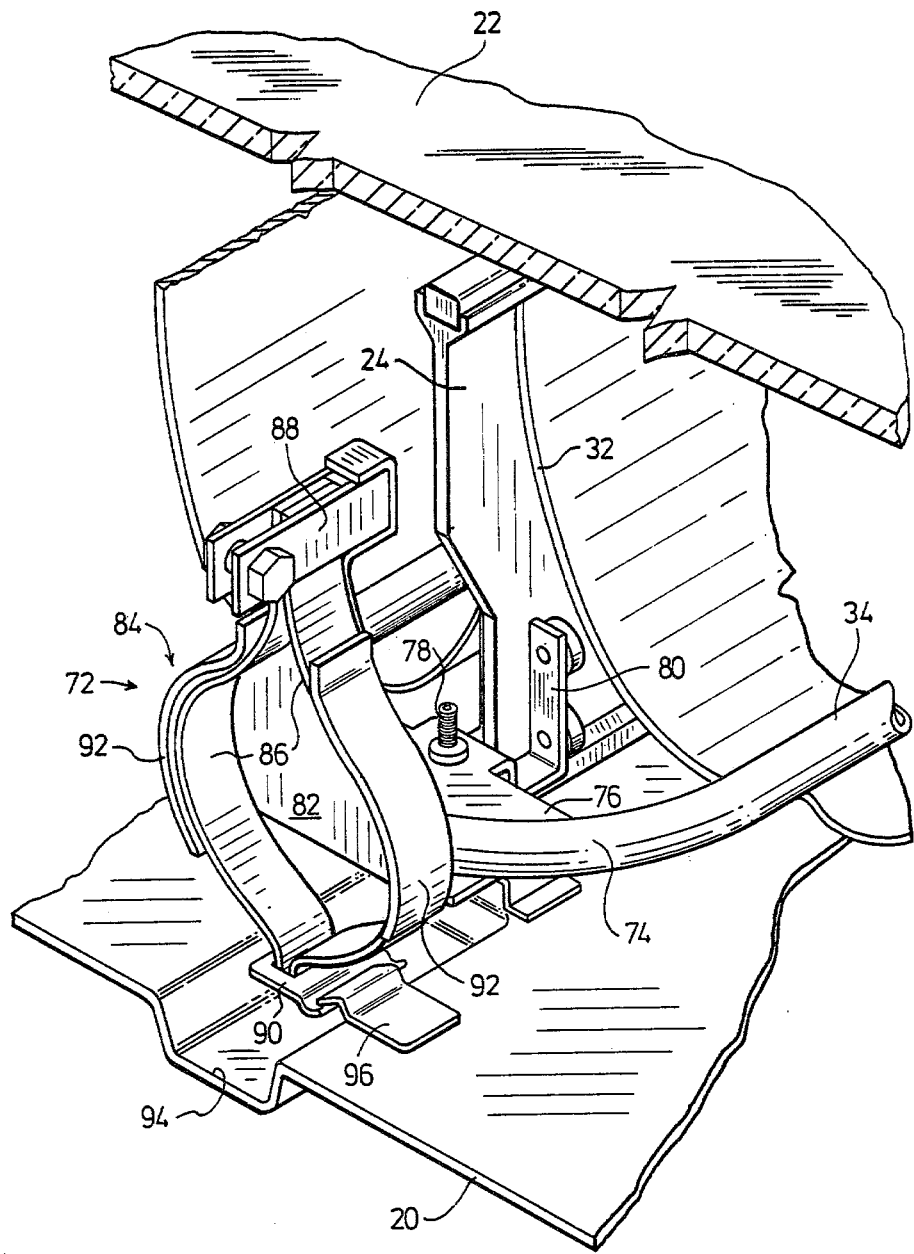
FIG. 8 is a perspective view of a device for moving the absorber tubes between the focussed and unfocussed positions in accordance with the second aspect of the invention.
Figure 9:
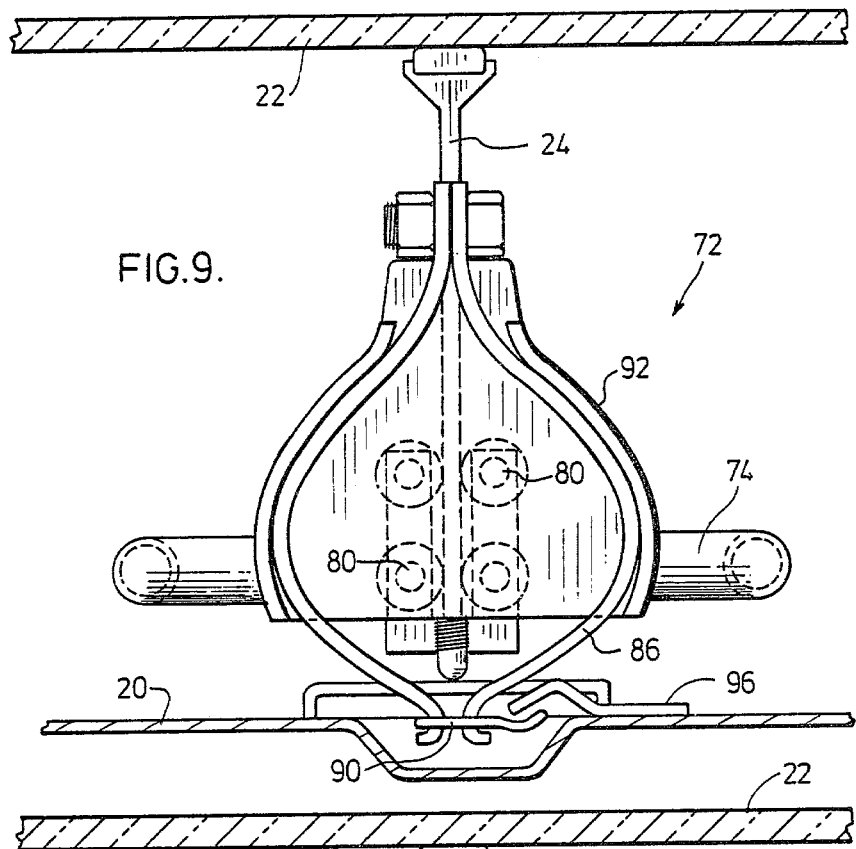
FIG. 9 is an end view of the device of FIG. 8 with the absorber tube in the focussed position.
Figure 10:
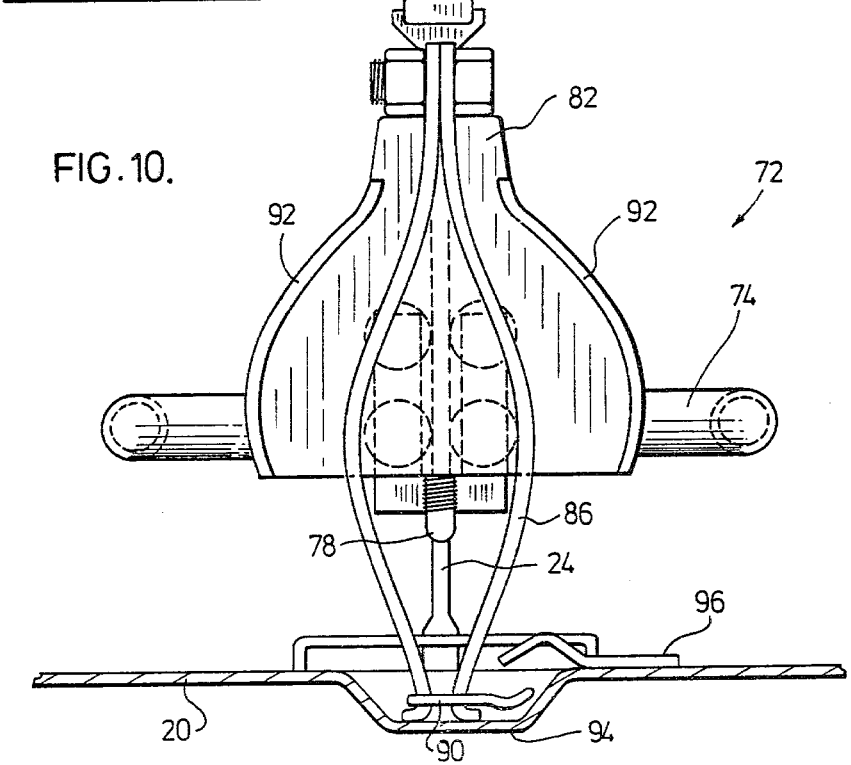
FIG. 10 is an end view similar to FIG. 9 with the absorber tube in the non-focussed position.

FIGS. 8 to 10 illustrate a mechanism 72 which is mounted on the curved portion 74 connecting the straight portions of absorber tube 34 passing through the reflectors 32. The mounting is effected in any convenient manner, such as brazing, to provide an efficient thermal connection between the tube 34 and the mechanism 72. FIGS. 1 and 7 illustrate (schematically in FIG. 7) an alternative structure in which four of such mechanisms 72 are connected to the support bars 36 for effecting movement of the bars 36 and thereby the absorber tube 34.

The mechanism 72 includes a support plate 76 constructed of heat conductive material having brazed thereon the curved position 74 of the absorber tube 34 which is adjustable in initial position by screw 78 to accommodate for minor variations in focal point of the individual reflector 32.

The support plate 76 is guided by the wall 24 through a pair of opposed wheeled structures 80 which engage opposite faces of the wall 24 for vertical movement of the support plate 76 relative to the wall 24. The wheels 80 are constructed of ceramic or other low thermal conductive material.

The support plate 76 has an upwardly-extending flange 82 to which is mounted a bimetallic strip structure 84. The bimetallic strip structure 84 is connected to the flange 82 at their upper extremities and includes opposed convex bimetallic loops 86 held by a clamp 88 at its upper end and inserted through a slot in a plate 90 at their lower end. The bimetallic strips 86 may be constructed of a laminate of a plurality of bimetallic elements to inhibit fracture. The bimetallic strips 86 engage stop walls 92 extending from the flange 82. In the rest position, the walls 92 engage the outer surface of the loops 86 to establish the maximum spacing therebetween and an intimate heat conductive path from the plate 76 to the bimetallic loops 86.

The tray 20 is provided with a depression 94 therein below the plate 90 and a further plate 96 welded to the tray 20 adjacent the depression 94 and extending over the depression 94 in such a way to overlie one edge of the plate 90.

In the normal operating position of the absorber tube 34 in the reflector 32, the mechanism 72 has the position shown in FIGS. 8 and 9. However, when the temperature of the transport fluid in the absorber tube 34 exceeds a predetermined value, for example, as a result of system malfunction or as a result of a lack of demand for heated fluid, then heat conduction through the support plate 76 to the bimetallic material causes the loops 86 to move towards each other and thereby the plate 90 to move downwardly in the depression 94 until engagement with the floor of the depression 94 occurs. This engagement provides a heat sink to atmosphere. Continued movement of the loops 86 towards each other then causes the support plate 76 to rise and the wheels 80 to ride up the wall 24.

The latter motion, which is substantially simultaneous for each mechanism 72 associated with the module 10, causes the absorber tube 34 to move upwardly and out of the focal point of the reflector 32. In this way, the only rays encountered by the absorber tube 34 are those falling directly therein through the glass cover 22. The absorber tube 34 remains out of the focal point until the absorber tube temperature drops again below the predetermined level. The mechanism 72 may be combined with an alarm mechanism to indicate system malfunction when the mechanism 72 is actuated.

The mechanism 72 serves to function automatically as a temperature controller or regulator for the transport fluid, moving out of heat collecting relationship with the reflector 32 as the temperature exceeds a predetermined level and returning to the heat collecting position, in the manner described below, as the temperature falls. In this way, the temperature of the transport fluid may be retained within a predetermined range under normal operating conditions.

The mechanism 72 also serves to displace automatically the absorber tube 34 under emergency conditions, such as, stagnation, or when the system is desired to be shut down for extended periods. By moving the absorber tube 34 out of the focal point in response to high temperature, possible damage to the absorber surface coating and other portions of the system as a result of excessive temperature is avoided.

When the fluid cools, the bimetallic loops 86 move away from each other, permitting the tube wheels 80 to ride down the wall 24 and the absorber tube 34 once more assume the focussed position to active solar energy collection.

To prevent hang-up of the wheels 80 on the wall 24 for any reason, interengagement between the plate 90 and the plate 96 is provided for, so that if the support plate 76 does not move downwardly upon cooling, the mechanical interaction of the engaged plates and the expanding loops 86 will pull the support plate 76 to the active position of the absorber tube 34. Once installed, the mechanism 72 is fully automatic.

The mechanism 72 operates in similar manner in the modification of FIGS. 3 and 7, except that the heat is transmitted to the bimetallic loops 86 through the support bars 36 in this instance. The focussed position of the absorber tube 34 is indicated in solid outline and the non-focussed position is indicated in dotted outline in FIGS. 5 and 7.

Figure 11:
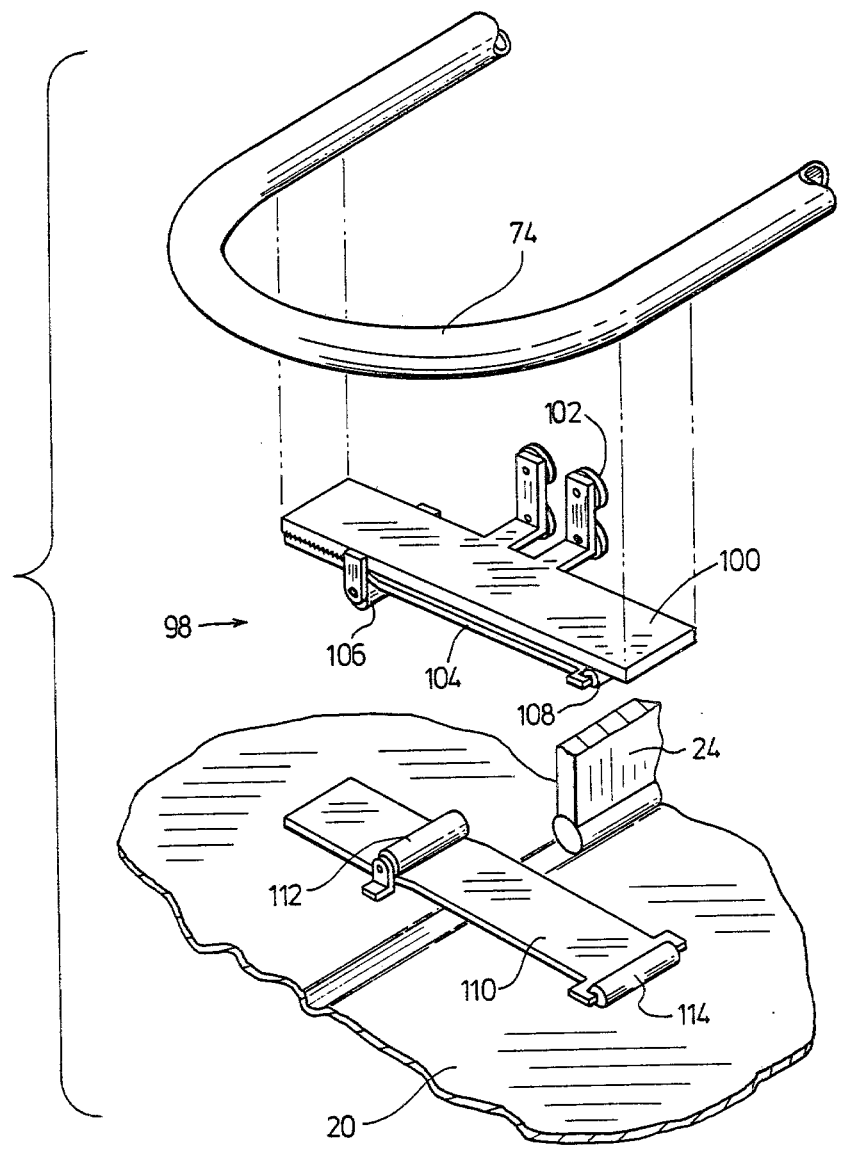
FIG. 11 is an exploded view of an alternative device for moving the absorber tube between focussed and non-focussed positions.
Figure 12:
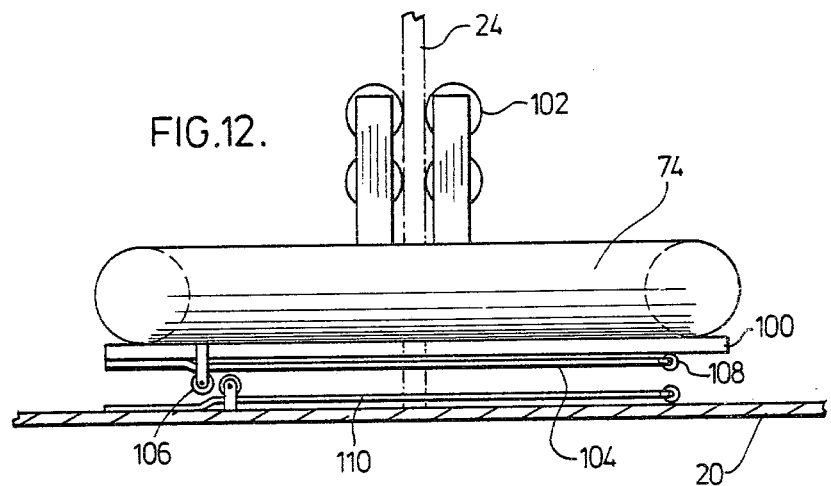
FIG. 12 is an end view of the device of FIG. 11 illustrated in the tube focussed position.
Figure 13:
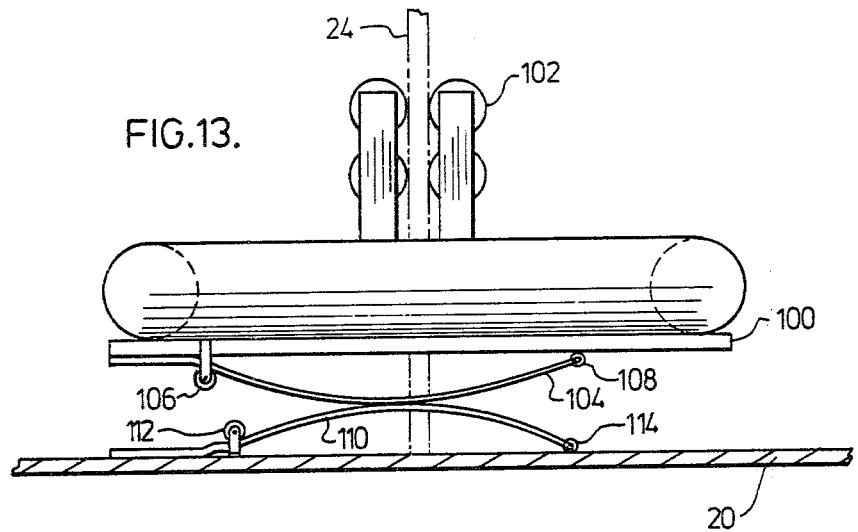
FIG. 13 is an end view of the device of FIG. 11 with the absorber tube in the non-focussed position.

An alternative form of device for moving the absorber tube 34 out of its focussed active position to an unfocussed inactive position in response to predetermined transport fluid temperature is illustrated in FIGS. 11 to 13. The mechanism 98 has a support plate 100 and a pair of opposed wheeled structures 102 engaging opposite faces of the wall 24.

On the underside of the support plate 100 is positioned a first bimetallic metal strip 104 which is gripped near one end to the plate 100 by a roller 106 for sliding movement relative thereto. At the free end of the strip 104 is mounted a second roller 108.

A second bimetallic metal strip 110 is located below the first strip 104 and is gripped near one end to the tray 20 by a roller 112 for sliding movement relative thereto. At the free end of the strip 104 is mounted another roller 114.

When the temperature of the transport fluid or the surface temperature of the absorber tube exceeds a predetermined value, heat conducted by the plate 100 to the bimetallic strip 104 causes the strip to bow away from the plate 100 with the roller 108 engaging the underside of the plate 100. As the bow increases, the strip comes into engagement with the second bimetallic strip which also then starts to bow away from the tray 20 with the roller 114 in engagement with the tray surface, thereby causing the absorber tube 34 to be lifted out of the focal point of the reflector 32.

Upon the fluid temperature falling below the predetermined level, the bimetallic strips 104 and 110 resume their initial positions, as illustrated in FIG. 12.

While the embodiment of the invention illustrated in FIGS. 3 and 7 to 13 has been described with respect to a modular unit using CPC collectors, the principles thereof are applicable to any other form of focussing collector arranged in any desired configuration.

The modular collector 10 also may achieve a photovoltaic function by producing an electrical output from collected solar energy. The absorber tube 34 may be coated with light energy actuable electricity generating material layers which communicate through suitable electrical connection to exterior of the collector 10.

SUMMARY OF DISCLOSURE

In summary of this disclosure, the present invention is directed to an improved modular solar energy collector system of simplified construction and to an improved focussing collector system having defocussing means. Modifications are possible within the scope of the invention.

What I claim is:

1. A modular solar collector, comprising:
   a tray-like element having an open top,
   an upper transparent element hermetically sealed to said tray-like element and closing said open top to define an evacuated module,
   a plurality of elongate, substantially parallel wall members located within the interior of said module and extending vertically between and in engagement with the base of the tray-like element and the inside surface of the transparent element separating said interior into a plurality of elongate compartments, said wall members constituting one portion of an integral supporting network located within said evacuated module,
   a plurality of support members extending transversely of each of said compartments at longitudinally-spaced locations therein interconnecting said wall members to form therewith and constituting another portion of said supporting network within said module;
   a plurality of individual elongate focussing reflectors positioned one in each of the compartments in engagement with the support members located in the respective compartment and thereby supported by said supporting network to receive light through said transparent element and focus the same, and
   an absorber tube extending in each compartment from one end to the other for conveying fluid to be heated into the compartment and for removing heated fluid from the compartment, in each compartment said absorber tube normally being located at the focus of said reflector.

2. The collector of claim 1 wherein said absorber tube passes in continuous manner from an inlet to the module to an outlet therefrom in alternate direction in each adjacent compartment.

3. The collector of claim 2 wherein said absorber tube has a selectively-absorbing surface thereon for selectively absorbing energy having predetermined wavelengths and rejecting other wavelengths.

4. The collector of claim 1, 2 or 3, wherein each of said reflectors has a concentration ratio of about 1 to about 50, said concentration ratio being defined as the ratio of the transverse width of the reflector adjacent said transparent element to the outer circumference of said absorber tube, and the reflecting surface thereof has mirror image cross-sectional shaped portions on either side of a vertical axis of the reflecting surface which is perpendicular to the transparent element each having a length required to ensure that no less than about 75% of the maximum efficiency of the reflector is realized.

5. The collector of claim 4 wherein said maximum efficiency is provided by the shape of said reflecting surface required to ensure that all incident rays received into said reflector through said transparent element within the acceptance angle $\theta$ subtended to said vertical axis and determined by the equation:

$$C = 1/\sin \theta$$

where C is the concentration ratio and $\theta$ is the acceptance angle, are concentrated on said absorber tube at said focus.

6. The collector of claim 5 wherein said reflecting surface has a length required to ensure that no less than about 90% of the maximum efficiency of the reflector is realized.

7. The collector of claim 5 wherein said concentration ratio is about 1.0 to about 3.0.

8. The collector of claim 7 wherein said concentration ratio is about 1.5 to about 2.0.

9. The collector of claim 1 wherein gaskets are provided between the top of the walls and the adjacent undersurface of the transparent element.

10. The collector of claim 1 wherein said tray-like element is made of steel and said transparent element is made of glass, and said transparent element is hermetically sealed to said tray-like element at the periphery of the transparent element in such manner as to permit the glass to bend along two parallel edges thereof and minimize stresses in the edge seal area.

11. The collector of claim 10 wherein the edge of said transparent element is joined to a flexible metal strip which is connected to a flange outwardly-extending from the upper rim of the tray, to permit said bending motion.

12. The collector of claim 11 wherein a gasket is located between said transparent element and an adjacent area of said tray rim.

13. The collector of claim 12 wherein said gasket is shaped to permit rolling motion relative to said tray rim to accept bending moments resulting from flexure of said glass element.

14. The collector of claim 1 or 10 including heat sensing means for sensing the temperature of said absorber tube, and means for moving said absorber tube out of said focus in response to sensed absorber tube temperatures exceeding a predetermined value.

15. The collector of claim 5 including heat sensing means for sensing the temperature of said absorber tube, and means for moving said absorber tube out of said focus in response to sensed absorber tube temperatures exceeding a predetermined value.

16. A solar collector, comprising:
an evacuated housing,
a focussing solar reflector located within the housing and having a reflecting surface receiving solar energy thereon through a transparent element of said housing and focussing the same from said surface to a focus in said housing;
an absorber tube located substantially at said focus of said reflector surface to absorb solar energy concentrated thereon at said focus and adapted to convey fluid to be heated through said collector;
said focussing reflector having a concentration ratio of about 1 to about 50, said concentration ratio being defined as the ratio of the maximum transverse width of said reflector to the outer circumference of the absorber tube;
said reflecting surface having mirror image cross-sectional shaped portions on either side of a vertical axis of the reflector, each having a length required to ensure that no less than about 75% of the maximum efficiency of the collector is realized;
said maximum efficiency being provided by the shape of said reflecting surface required to ensure that all incident rays received into said collector through said transparent element and within the acceptance angle $\theta$ subtended to said vertical axis and determined by the equation:

$$C = 1/\sin \theta$$

where C is the concentration ratio and $\theta$ is the acceptance angle, are concentrated on said absorber tube at said focus;
heat conductive means located within said housing supporting said absorber tube and normally positioning said absorber tube at said focus, said heat conductive means sensing the temperature of said absorber tube, and
heat sensitive means located within said enclosure movable between first and second positions corresponding to focussed and non-focussed positions of said absorber tube with reference to said reflector surface,
said heat sensitive means being mechanically interconnected with said heat conductive means and in heat conducting relationship therewith to effect movement of said absorber tube through said mechanical interconnection with said heat conductive means from the focussed position to the non-focussed position thereof in response to sensed absorber tube temperatures exceeding a predetermined value.

17. The collector of claim 16 wherein said concentration ratio is about 1.0 to about 3.0.

18. The collector of claim 17 wherein said concentration ratio is about 1.5 to about 2.0.

19. The collector of claim 16 wherein a plurality of said reflectors are arranged in said evacuated housing to provide a modular collector, said absorber tube passes sequentially through said reflectors within said housing, and said heat sensitive means and said heat conductive means are arranged to simultaneously move said absorber tube out of the focus of each said reflector in said module.

20. The collector of claim 19 wherein said absorber tube is mounted adjacent each end of the length thereof passing through an individual reflector on transverse bar means extending across the width of said module within said housing, and said heat conductive means and heat sensitive means are operatively associated with each said bar means.

21. The collector of claim 19 or 20 wherein said heat conductive means comprises a heat conductive element in heat conductive relationship with said absorber tube, and said heat sensitive means comprises bimetallic strip means mounted to said heat conductive element and means connected to said bimetallic strip means for moving said heat conductive element in response to movement of said bimetallic strip means from said first position to said second position under the influence of sensed temperatures of said absorber tube exceeding said predetermined temperature.

22. A modular solar collector, comprising:
a plurality of focussing reflector surfaces for receiving solar energy thereon and for focussingly reflecting the same towards the focus of each said surface,
an absorber tube located substantially at the focus of each said reflector to absorb solar energy concentrated thereon at said focus by said focussing reflector surface and adapted to convey fluid to be heated through said collector;

means establishing a heat conductive path from said absorber tube comprising a heat conductive element in heat conductive relationship with said absorber tube, heat sensitive means comprising bimetallic strip means to said heat conductive element movable between first and second positions corresponding to focussed and non-focussed positions of said absorber tube with respect to said reflector surfaces in response to heat passing along said heat sensitive means to said absorber tube to effect movement thereof between said focussed and non-focussed positions in response to sensed absorber tube temperatures exceeding a predetermined value, said heat conductive element comprising a horizontal flange member operably connected to said absorber tube to establish said heat conductive relationship and an upright housing member having forwardly extending facing curved arms normally engaging to bimetallic strips which are outwardly bowed away from each other, said bimetallic strips being mounted to said upright housing member adjacent the upper end thereof and mounted to stop engaging means at the lower end thereof, whereby the temperature of said absorber tube normally is sensed by said bimetallic strips, and first fixed location stop means for engagement by said stop engaging means during movement of said bimetallic strips towards each other and away from said curved arms in response to sensed temperatures exceeding said predetermined temperature and for imparting lifting motion on the flange during continued movement of said bimetallic strips towards each other to move said absorber tube from said focussed to said non-focussed position.

23. The collector of claim 22 including guide means for guiding vertical movement of said flange member during said lifting motion.

24. The collector of claim 22 including second fixed location stop means normally engaging said stop engaging means when said bimetallic strips are in said arm-engaging position and arranged to be engaged by said stop engaging means during movement of said bimetallic strips away from each other to assist in restoring said absorber tube to said focussed position.

25. The collector of claim 23, wherein said guide means includes rollers engaging and rolling on said upright housing member, said rollers being mounted on a second flange integrally formed with the first-mentioned flange element.

* * * * *